(12) United States Patent
Tang et al.

(10) Patent No.: US 6,810,076 B1
(45) Date of Patent: Oct. 26, 2004

(54) EFFICIENT ECHO CANCELLER FOR ADSL APPLICATIONS

(75) Inventors: Song-Nien Tang, Kaoshiung (TW); Ching-Kae Tzou, Hsinchu Hsien (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 670 days.

(21) Appl. No.: 09/611,674

(22) Filed: Jul. 7, 2000

(51) Int. Cl.$^7$ .............................. H04B 1/40; H04B 1/12
(52) U.S. Cl. ....................... 375/219; 375/222; 375/232; 367/435; 379/410
(58) Field of Search .................................. 375/219, 222, 375/232; 370/289–291; 367/135; 379/406.08, 406.14; 455/570

(56) References Cited

U.S. PATENT DOCUMENTS

| | | | | |
|---|---|---|---|---|
| 4,903,247 A | * | 2/1990 | Van Gerwen et al. ...... 367/135 |
| 5,014,263 A | * | 5/1991 | Vairavan et al. ............ 370/290 |
| 5,317,596 A | * | 5/1994 | Ho et al. ..................... 375/232 |
| 5,587,998 A | * | 12/1996 | Velardo et al. ............. 370/289 |
| 5,787,113 A | * | 7/1998 | Chow et al. ................ 375/219 |
| 5,937,060 A | * | 8/1999 | Oh ........................ 379/406.14 |

* cited by examiner

Primary Examiner—Chieh M. Fan
Assistant Examiner—Edith Chang

(57) ABSTRACT

Architecture of an efficient adaptive digital echo canceller includes a frequency domain update block, a far-end signal estimation block and a time domain echo cancellation block. The echo canceller has a training mode in which the frequency domain update block and far-end signal estimation block are first trained to estimate the echo channel and target channel. After the training mode, the time domain echo cancellation block uses the estimated echo channel to synthesize an echo replica and subtracted it from the received signal continuously before or in an operation mode. When a synchronization frame is received in the operation mode, the frequency domain update block and the far-end signal estimation block are used to retune both echo channel and target channel for improving system performance.

6 Claims, 7 Drawing Sheets

EFFICIENT ECHO CANCELLER FOR ADSL APPLICATIONS

FIELD OF THE INVENTION

The present invention relates generally to an echo canceller, and more specifically to an efficient adaptive digital echo canceller for eliminating the echo interference to a modem operating in a full-duplex environment.

BACKGROUND OF THE INVENTION

In recent years, multi-tone modulation has become very popular for reliable data communication with the highest possible data rate, and has been proven quite successfully. The asymmetric digital subscriber line (ASDL) standard adopts the discrete multi-tone modulation (DMT) technology to provide high speed data transmission on a band-limited channel.

In general, an ADSL system operates over a twisted-pair telephone loop. Because of imperfect impedance matching of a twisted-pair loop over a wide frequency band, an echo may be created when a transmitted signal is passing through and partially reflected back from a hybrid circuit in the ADSL system. The echo is undesired leakage of transmitted signals from a transmitter and feedback into a near-end co-located receiver. It causes great interference to the intended signal reception.

It is possible to separate the bandwidth in the two directions of a full-duplex transmission system over a twisted-pair loop and thus reduce the echo by means of frequency-division multiplexed (FDM) technique. However, the data rate is decreased due to the limited bandwidth. In many cases, it is desirable that an ADSL modem have the option of using overlapped bandwidth in the two directions of transmission to increase the aggregate data rate and improve the transmission throughput. Therefore, an efficient echo canceller is necessary to eliminate the echo interference in a full-duplex modem that has frequency-overlapped option for data transmission.

An echo canceller can be accomplished using either an analog circuit or a digital circuit. FIG. 1 illustrates the application of a traditional digital adaptive echo canceller in a data transmission system that includes a transmit path 101, a transmit filter 102, a digital-to-analog converter (DAC) 103, a hybrid circuit 104, an analog-to-digital converter (ADC) 105, a receiver filter 106 and a receiver path 107. In most cases ,an echo canceller 108 is installed in parallel with the echo path that includes the transmit filter 102, the digital-to-analog converter (DAC) 103, the hybrid circuit 104, the analog-to-digital converter (ADC) 105, and the receiver filter 106. The echo canceller 108 estimates the echo channel and produces an echo replica that can be subtracted from the received signal before it enters the receiver path 107.

Several echo cancellation techniques have been presented in the prior arts. An example of conventional echo cancellers uses a finite response filter (FIR) with long taps to model the echo channel and cancel the echo in time domain. To efficiently eliminate the echo, the conventional echo canceller has to update its FIR tap coefficients very frequently in time domain and the computational complexity is very high. It does not present an effective solution to the ADSL applications. Another example of conventional echo cancellers is implemented purely in frequency domain based on the dual relationship between frequency domain and time domain. The implementation of this type of echo cancellers requires a high-order fast Fourier transform (FFT) or inverse fast Fourier transform (IFFT) that takes extra effort and cost.

J. M. Cioffi and J. Bingham published a paper titled "A Data-Driven Multitone Echo Canceller" in Vol. 42, No. 10, IEEE Transactions on Communication, October 1994. An echo canceller design containing a frequency-domain canceller for coefficient setting and updating and a time-domain canceller for echo synthesis is disclosed in the paper. The design requires very frequent FFT/IFFT operations between frequency and time domains. In addition, the assumptions in achieving their design can not be satisfied in long echo channels.

Minnie Ho, J. Cioffi and J. Bingham further presented another echo canceller in a paper titled "Discrete Multitone Echo Cancellation" in Vol. 44, No. 7, IEEE Transactions on Communication, July 1996. The echo canceller also relies on both time and frequency domain cancellation to cancel echoes. The innovative structure can reduce significantly the computational complexity of an echo canceller for ADSL or similar applications in the numbers of multiplication and addition in some cases. However, it does not really gain much advantages for an ASIC implementation of the architecture from the real time processing point of view when the echo channel is not short enough, is which case the time domain tail emulation in the architecture of ASIC still needs a lot of numerical operation.

SUMMARY OF THE INVENTION

The present invention has been made to meet the requirement of echo cancellation in a full-duplex ADSL application. The primary object is to provide an architecture for an efficient adaptive echo canceller. According to the invention, the echo canceller comprises a frequency domain update block, a far-end signal estimation block and a time domain echo cancellation block.

The frequency domain update block generates a frequency domain echo channel estimate of which an inverse fast Fourier transform is computed to form a synthesized time domain echo channel. The far-end signal estimation block generates an estimate of a frequency domain target channel i.e. the combination of the loop channel and the time-domain equalizer (TEQ) for synthesizing a far-end signal which should be subtracted from residual echo estimate at show time to obtain an error term signal. The error term signal is used for updating and returning the frequency domain echo channel estimate in the frequency domain update block at show time. The time domain echo cancellation block synthesizes an echo replica using the estimated time domain echo channel and subtracted the echo replica from a received signal.

Another object of the present invention is to provide a method for training the adaptive echo canceller. Accordingly, the adaptive echo canceller has a training mode to approach the expected system performance. In the training mode, the echo canceller starts with an echo channel training state in which the tap coefficients of the echo channel are trained. In the invention, the system uses periodic frames such as PRU (persudo random upstream codes) for this training. After the echo channel estimate has been trained, the training mode continues with a target channel training state in which the frequency domain target channel estimate is trained.

It is also an object of the present invention to provide a returning method for updating the target channel estimate and echo channel estimate. After the training mode, the echo canceller is switched to an operation mode. The echo canceller continues the time domain echo synthesis and echo cancellation frame by frame. When a synchronization frame is received, both frequency domain echo channel estimate and target channel estimate are returned to improve the system performance.

Other features and advantages of the invention will become better understood from the following description of the invention which refers to the accompanying drawings.

DESCRIPTION OF THE PREFERRED EMBODIMENTS

Figure 1:
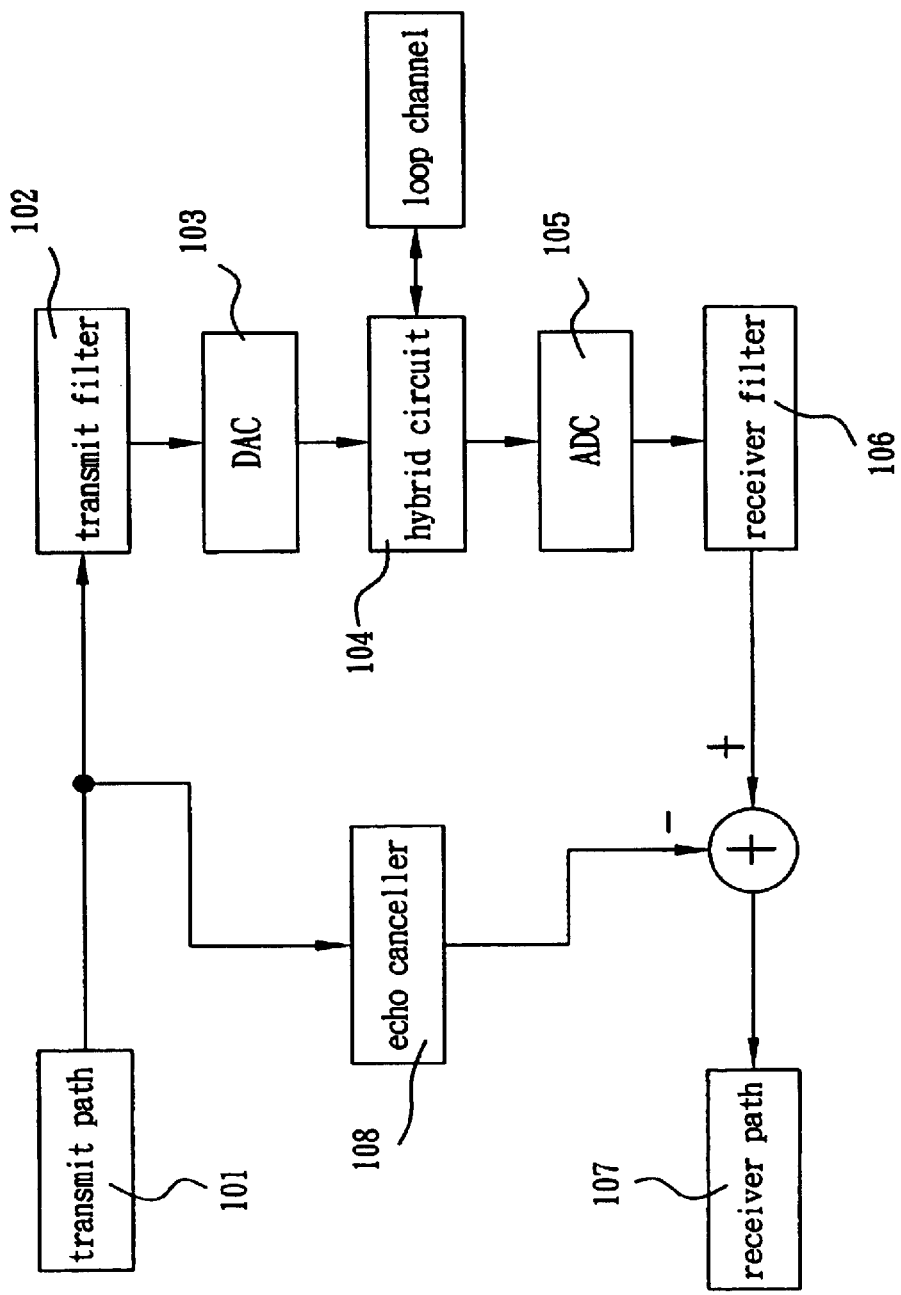
FIG. 1 illustrates the application of a traditional digital adaptive echo canceller in a data transmission system.
Figure 2:
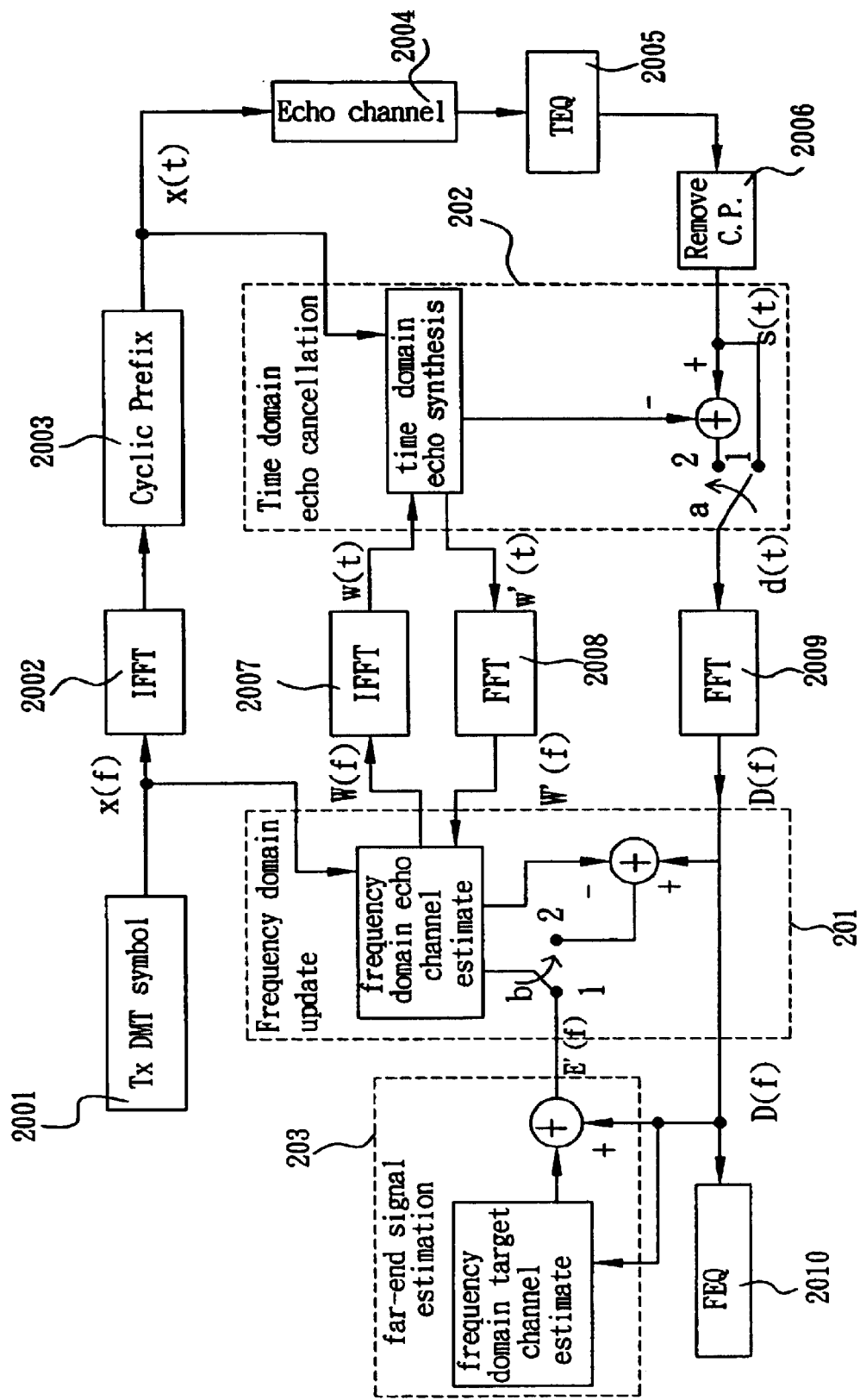
FIG. 2 illustrates the application of the adaptive echo cancellor of the present invention in an ADSL application.

With reference to FIG. 2, the functional block diagram of the architecture of the echo canceller of the present invention is shown. In a DMT transceiver as shown in the figure, modulation and demodulation are performed by IFFT 2002 and FFT 2009 respectively. As shown in FIG. 2, A cylic prefix operation 2003 along with the IFFT 2002 modulation transforms the channel into a bank of parallel independent sub-channels. When the signal is transmitted, echo occurs and is transmitted through the echo channel 2004. The three major functional blocks of the echo cancellor of this invention comprises frequency domain update 201, time domain echo cancellation 202 and far-end signal estimation 203.

The echo channel is estimated in frequency domain by means of an adaptive least mean square (LMS) algorithm or other similar algorithm to accomplish the function of frequency domain update 201. A frequency domain echo channel training is first performed to estimate the echo channel response. The estimated echo channel frequency response is then transformed into time domain using IFFT 2007 to form a synthesized time domain echo channel estimate. It is worthwhile to point out that the transformation from the frequency domain to its time domain equivalent is infrequent during show time period and, thus, the IFFT block 2007 can be shared with other signal processing blocks in an ADSL system.

As shown in FIG. 2, a time domain equalizer (TEQ) 2005 equalizes the received signal and the cyclic prefix is removed by the functional block 2006. The time domain cancellation 202 performs linear convolution of a transmitted signal with the estimated time domain echo channel response to synthesize an echo replica. The synthesized echo replica is then subtracted from the received signal after the cyclic prefix has been removed.

The far end signal estimation 203 is used to generate an estimate of a target channel impulse response, and synthesize the far-end signal estimate. At show time, the far-end signal estimate is subtracted from the received signal with echo replica removed, and generate an error term signal. The error term signal is used to update and re-tune the echo channel estimate.

Figure 3:
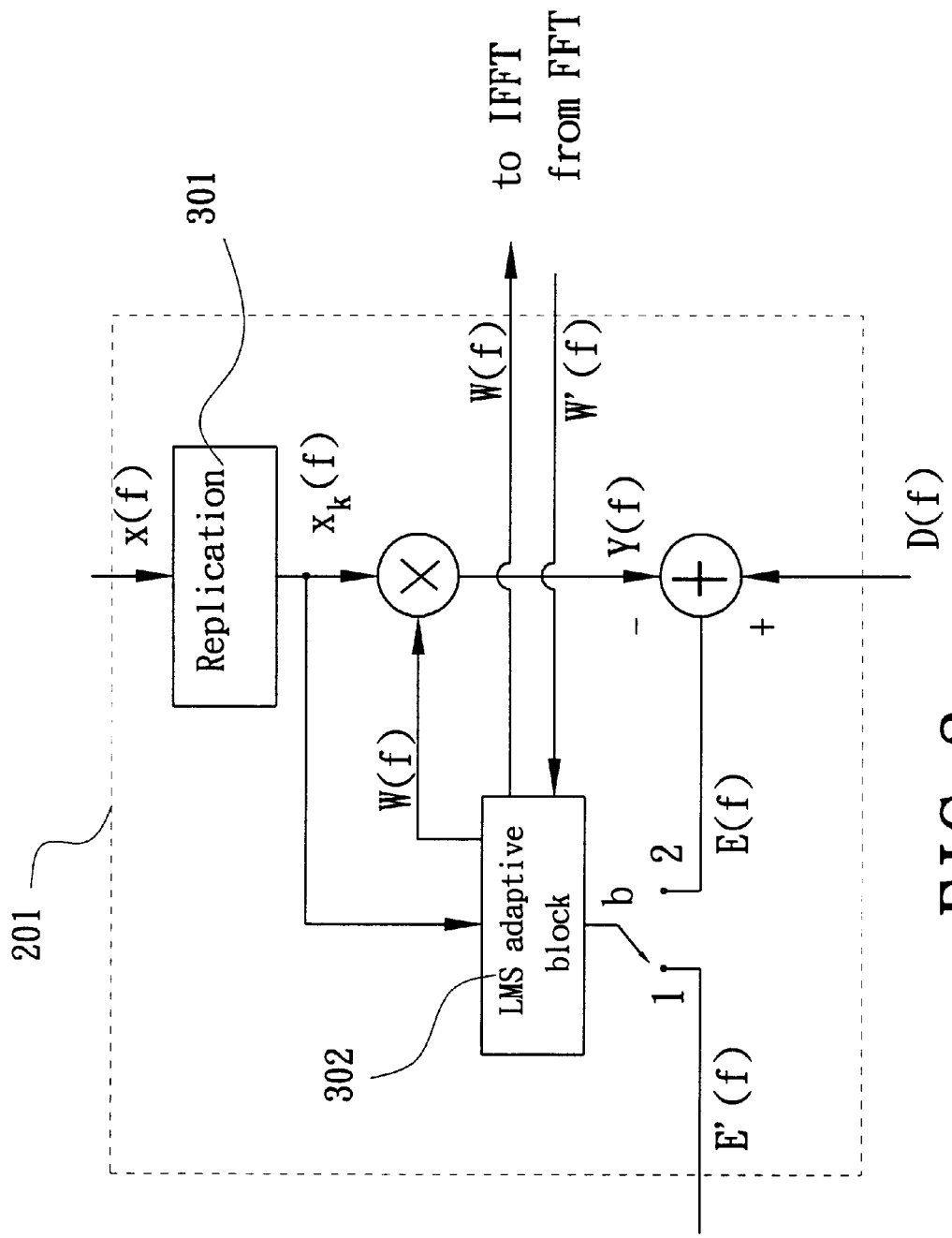
FIG. 3 shows the block diagram of the frequency domain update according to the present invention.

FIG. 3 shows a block diagram of the frequency domain update 201. The frequency domain transmitted PRU signal X(f) is replicated k times by the replication block 301 to form the replicated signal $X_k(f)$. The LMS adaptive block 302 receives the replicated signal $X_K(f)$ and outputs a frequency domain estimate W(f) of the echo channel.

During the training mode, switch 'b' is switched to position 2. The frequency domain estimate W(f) multiplies with the replicated signal $X_K(f)$ to form an estimated frequency domain echo signal Y(f). An error signal E(f) is obtained by comparing Y(f) with the actual frequency domain echo D(f) from the FFT block 2009, i.e., E(f)=D (f)−Y(f). The error signal E(f) is then fed back to the LMS adaptive block 302 to update the frequency domain estimate by the following equation:

$$W(f)=W_0(f)+\mu_1 \cdot E(f) \cdot X_k^*(f),$$

where W(f) is the updated frequency domain estimate and $W_0(f)$ is the last estimate, $X_k^*(f)$ is the conjugated signal of $X_K(f)$ and $\mu_1$ is the step-size factor for update. The above operation is referred to as LMS_1 operation.

During the operation mode, switch 'b' is switched to position 1. The error signal E(f) is replaced by the output E'(f) of the far-end signal estimation 203. The frequency domain update of the echo channel is performed by:

$$W(f)=W'(f)+\mu_1 \cdot E'(f) \cdot X_K^*(f),$$

where W(f) is the updated frequency domain estimate and W'(f) is the fast Fourier transform of a truncated and zero-padded time domain echo channel estimate which will be described later. In the following description, the above operation is referred to as LMS_2 operation.

Figure 4:
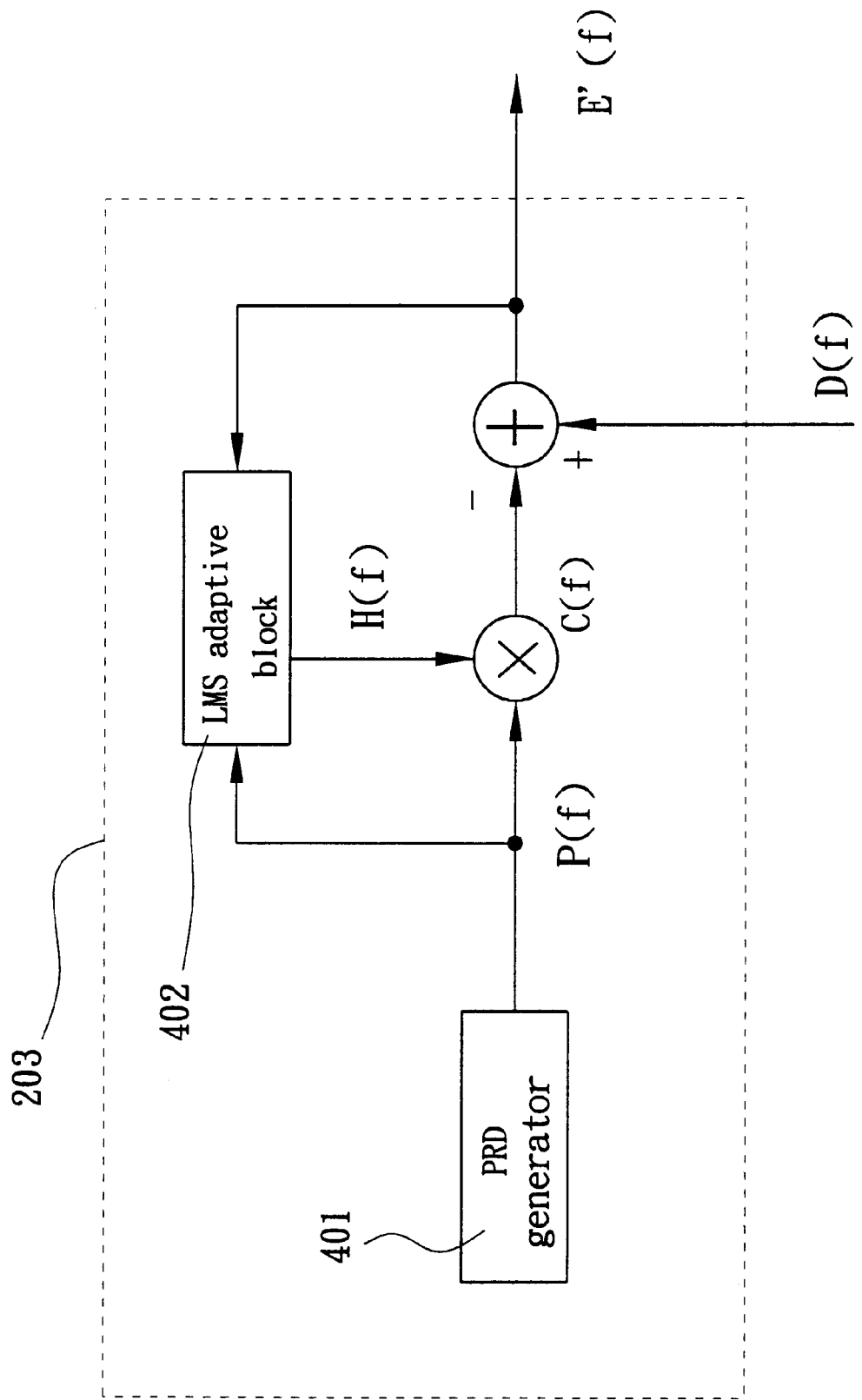
FIG. 4 shows the block diagram of the far-end signal estimation according to the present invention.

FIG. 4 shows a block diagram of the far-end signal estimation block 203. PRD generator 401 is a pseudo random number generator for generating pseudo random downstream codes that are defined in ADSL standard for synchronization frame and REVERB state. The LMS adaptive block 402 performs adaptive frequency domain target channel update according to the following equation:

$$H(f)=H_0(f)+\mu_2 \cdot E'(f) \cdot P^*(f),$$

where H(f) is the updated frequency domain target channel estimate and $H_0(f)$ is the last estimate, $P^*(f)$ is the conjugated signal of generated pseudo random codes P(f) and $\mu_2$ is the step-size factor for update. The above operation is referred to as LMS_3 operation in the following description.

Figure 5:
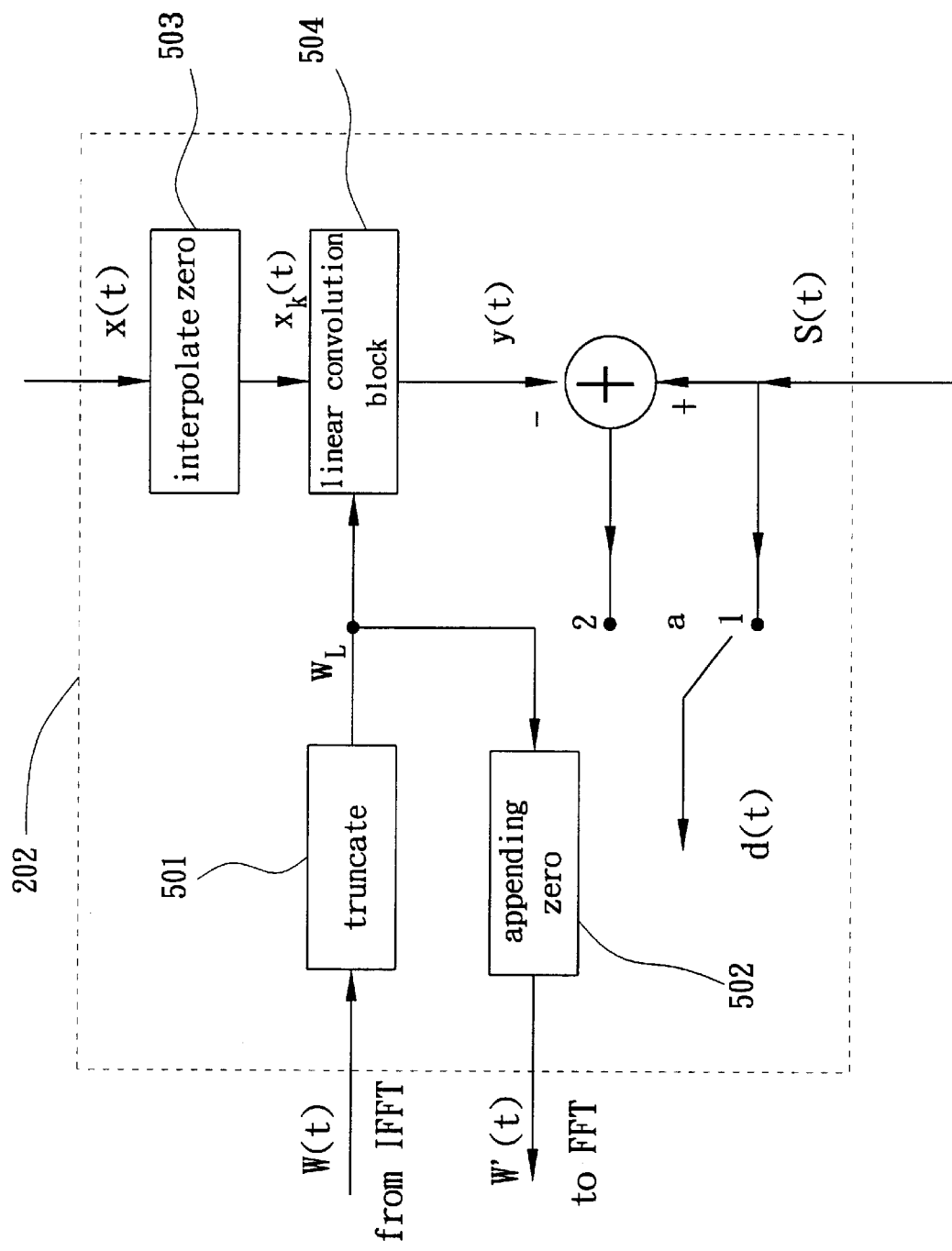
FIG. 5 shows the block diagram of the time domain echo cancellation according to the present invention.

FIG. 5 shows the block diagram of the time domain echo cancellation 202. As can be seen from FIG. 2, the frequency domain estimate of the echo channel is transformed by the IFFT block 2007 to form a time domain estimate of the echo channel response. The time domain time response w(t) is truncated to form $w_L(t)$ having a length of L by the truncation block 501, where L is the estimated length of the echo channel response. The transmitted signal x(t) has a length of N. Between every two samples of x(t), K−1 samples of zeros are interpolated to form $x_k(t)$ signal which has a length of K*N.

The truncated time domain response $w_L(t)$ is padded with K*N−L zeros to form w'(t) with a length of K*N. The zero padded time domain response w'(t) is transformed into W'(f) for updating the frequency domain echo channel estimate as described earlier. The signal $x_k(t)$ and the truncated time domain response $w_L(t)$ are convolved in the linear convolution block 504 to form-the estimated echo replica y(t) in time domain.

During the training mode, switch 'a' is switched to position 1 and d(t) represents the signal received from the echo channel without time domain cancellation. During the operation mode, switch 'a' is switched to position 2, the estimated echo y(t) is subtracted from the signal s(t) to accomplish the time domain echo cancellation.

According to the invention, the system is switched from a training mode to an operation mode to maintain the expected system performance. Both training and operation modes are designed specifically for the link setup procedure defined in the ADSL standard. With reference to FIG. 2, in the training mode, the echo canceller starts to estimate the frequency domain echo channel. Switch 'a' is switched into position 1 and switch 'b' is switched into position 2.

The system uses periodic PRU frames to train the echo channel response in frequency domain. The time domain cancellation 202 is put on hold because there is no far-end signal present at this training state according to the ADSL standard. After the training is finished, the estimated frequency domain echo channel W(f) is transformed into time domain tap coefficients by the IFFT. Switch 'a' is put in position 2 and the system then starts time domain echo replica synthesis and cancellation. At this moment, the far-end signal estimation starts its training operation.

Figure 6:
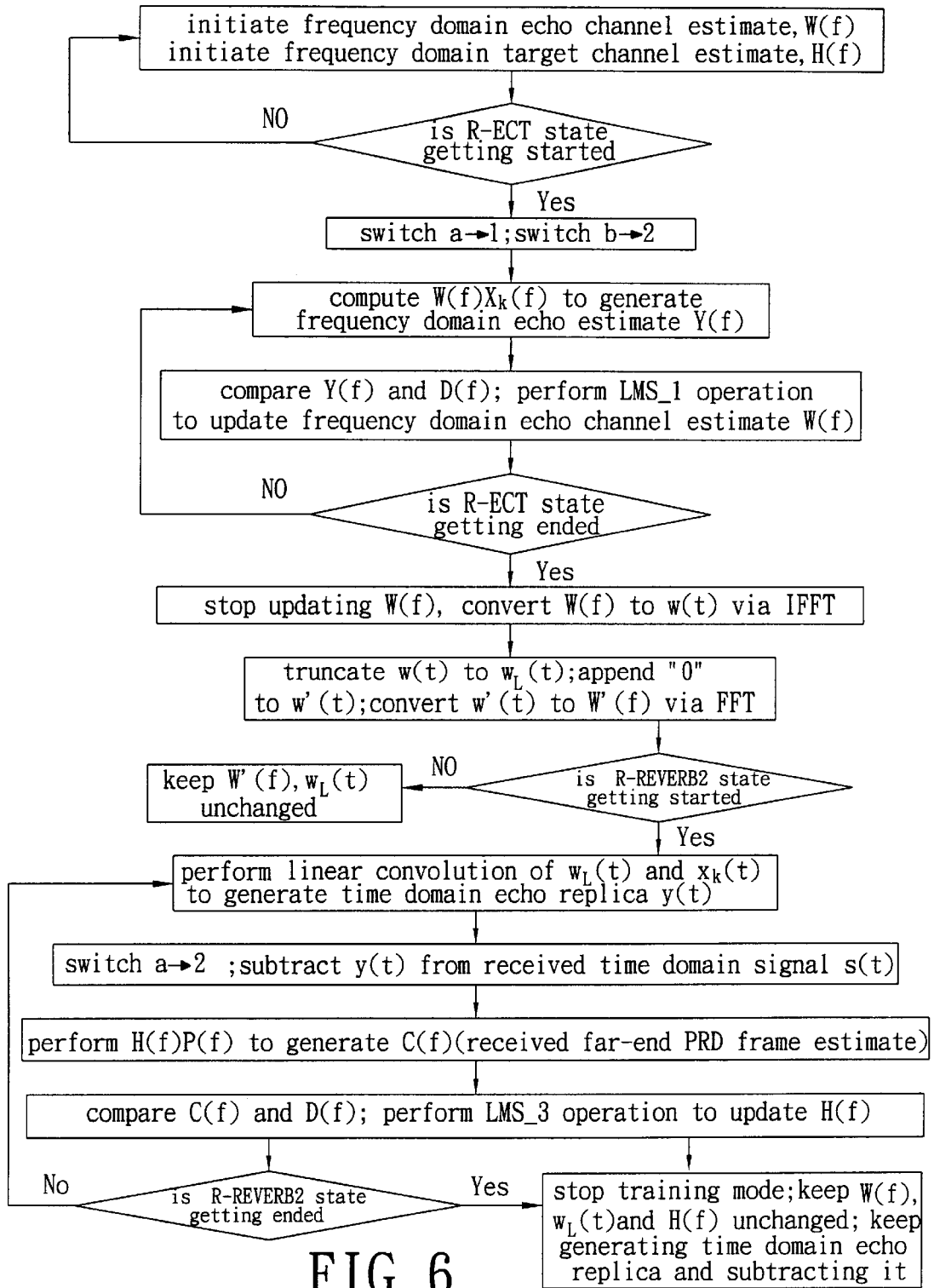
FIG. 6 shows the flow chart of the training mode for the adaptive echo cancellor according to the invention.

FIG. 6 illustrates the flow chart of the training mode according to the invention. The frequency domain echo channel estimate W(f) is initiated, and the frequency domain target channel estimate H(f) is also initiated. The system waits until echo channel training state (which is defined as R-ECT state in the ASDL standards) gets started. After the echo channel training state is started, switch 'a' is set to position 1 and switch b is set to position 2. As illustrated in FIG. 3, $W(f)X_K(f)$ is computed to generate the frequency domain echo estimate Y(f). The actual frequency domain echo D(f) is compared with the estimated echo Y(f) and the error signal E(f) is used to update the frequency domain echo channel estimate by means of the LMS_1 operation. The frequency domain echo channel training continues until the echo channel training state ends.

After the echo channel training completes, the frequency domain echo channel estimate W(f) stops updating and the time domain echo channel estimate w(t) is computed by IFFT. As shown in FIG. 5, the response w(t) is truncated to become $W_L(t)$ which is padded with zeros to form w'(t). The frequency domain estimate W'(f) of the truncated echo channel is then computed by FFT. The system waits for the target channel training state (for example, R-REVERB2 state in the ADSL standards) to start. Both $W_L(t)$ and W'(f) are kept unchanged for the following far-end signal estimation training.

After the target channel training state is started, switch 'a' is switched into position 2 and the linear convolution of $w_L(t)$ and $x_k(t)$ is computed to generate the time domain echo replica y(t) as shown in FIG. 5. The echo replica y(t) is subtracted from the received time domain signal s(t). The far-end PRD frame estimate C(f) =H(f)P(f) is computed as shown in FIG. 4. The error signal obtained by comparing C(f) and actual far-end signal with echo replica removed, D(f) is used to update H(f) by means of the LMS_3 operation as described earlier. The training continues until the target channel training state ends.

Figure 7:
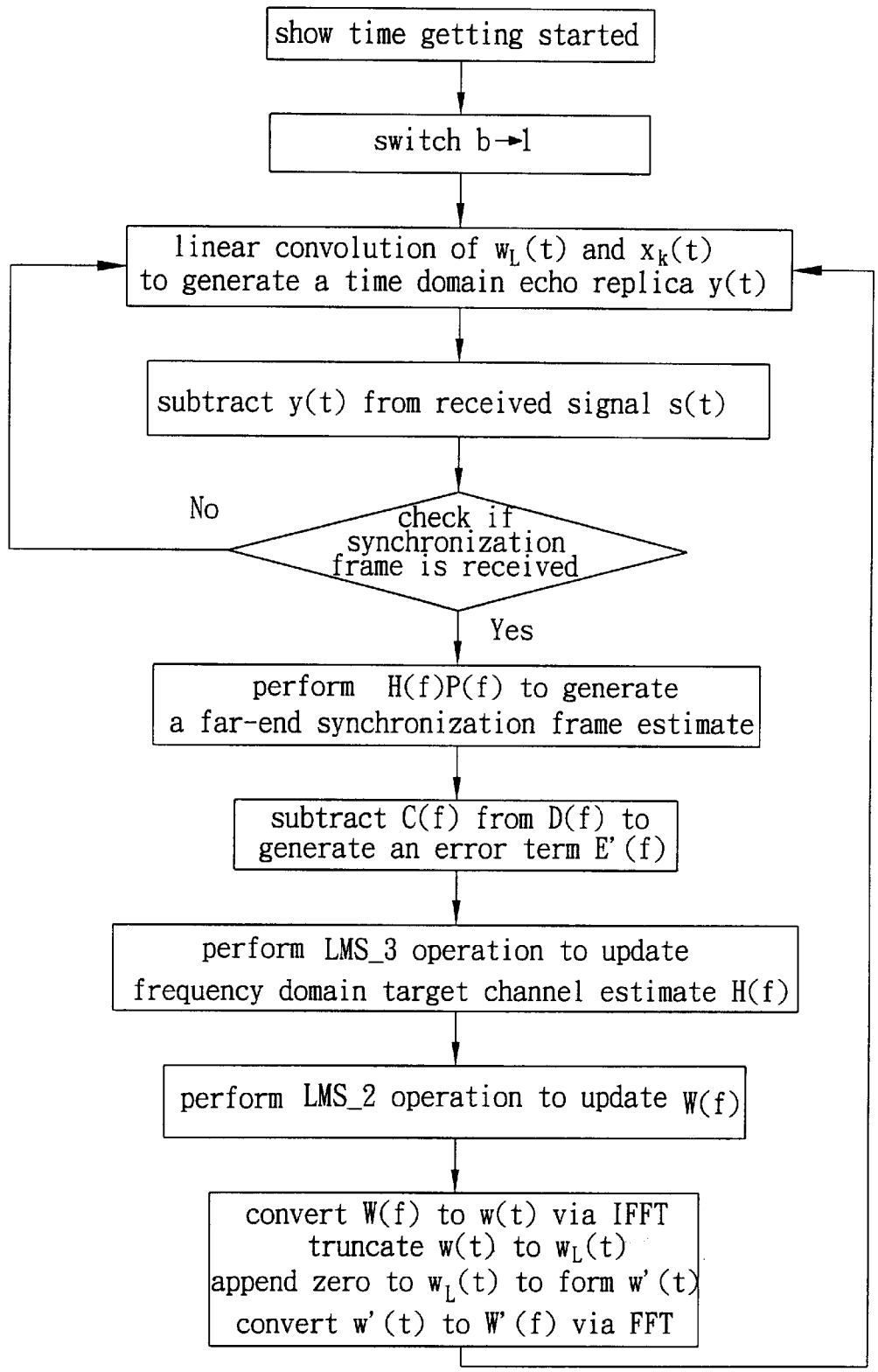
FIG. 7 shows the flow chart of the operation mode for the adaptive echo cancellor according to the invention.

After both echo channel training and target channel training complete, the system is in an operation mode. FIG. 7 illustrates the flow chart of the operation mode. During the operation mode, switch 'b' is set to position 1 when show time period gets started. The linear convolution of $w_L(t)$ and $x_k(t)$ is computed to generate a time domain echo replica y(t). The replicated echo y(t) is subtracted from the received signal s(t). The time domain echo cancellation continues in the operation mode until a synchronization frame is received.

When a synchronization frame is received, a far-end synchronization frame estimate is generated by computing C(f)=H(f)P(f) and subtracting C(f) from the actual frequency domain signal with echo replica removed, D(f) to generate the error term E'(f). The frequency domain target channel estimate H(f) is then updated by the LMS_3 operation. The frequency domain echo channel estimate W(f) is also updated by the LMS_2 operation. The corresponding $w_L(t)$ and W'(f) are also updated and the system gets back to the operation mode.

At show time period, the echo canceller continues the time domain echo synthesis and cancellation frame by frame. It does further frequency domain echo channel re-tuning and updating only when a synchronization frame is received. It is important to note that the far-end signal estimate is subtracted from the error term before the error term is used to update coefficients of the echo channel estimates. When the echo channel is re-tuned, switch 'b' is switched to position 2. Switch 'a' is always switched to position 2 during this period of show time.

Although only the preferred embodiments of this invention were shown and described in the above description, numerous changes in the detailed construction and combination as well as arrangement of parts may be restored to without departing from the spirit or scope of the invention as hereinafter set forth in the appended claims. It is requested that any modification or combination that comes within the spirit of this invention be protected.

What is claimed is:

1. An adaptive echo canceller comprising:

a frequency domain update block for estimating and updating a frequency response of an echo channel;

a far-end signal estimation block for estimating a frequency response of a target channel and sending a far-end error signal with far-end signals removed to said frequency domain update block for updating the estimated echo channel frequency response; and a time domain echo cancellation block for receiving the updated echo channel frequency response and performing time domain echo cancellation;

wherein said time domain echo cancellation block comprises;

a zero interpolator receiving a time domain signal and generating an interpolated time domain signal by inserting a pre-determined number of zeros between every two samples of said time domain signal;

a truncater for truncating a inverse fast Fourier transform of said estimated echo channel frequency response and generating a truncated time domain echo channel estimate;

a linear convolver for convolving said interpolated time domain signal and said truncated time domain echo channel estimate, a zero padding block for padding zeros to said truncated time domain echo channel estimate.

2. The adaptive echo canceller according to claim 1, said frequency domain update block comprising:

a replication block for receiving a frequency domain signal and generating a replicated frequency domain signal;

an adaptive estimation block for receiving said replicated frequency domain signal and outputting the estimated echo channel frequency response;

a multiplier for multiplying said estimated echo channel frequency response with said replicated frequency domain signal and generating a frequency domain echo replica; and a subtractor for subtracting said frequency domain echo replica from an actual frequency domain echo signal and generating an error signal for updating said estimated echo channel frequency response.

3. The adaptive echo canceller according to claim 2, said far-end signal estimation block comprising:

a pseudo random number generator for generating pseudo random codes;

an adaptive estimation block receiving said pseudo random codes and estimating the target channel frequency response;

a multiplier for multiplying said pseudo random codes with the estimated target channel frequency response and generating a frequency domain pseudo random frame estimate; and a subtractor for subtracting said frequency domain pseudo random frame estimate from an actual received frequency domain pseudo random frame and sending said far-end error signal to said adaptive estimation block.

4. The adaptive echo canceller according to claim 1, said far-end signal estimation block comprising:

a pseudo random number generator for generating pseudo random codes;

an adaptive estimation block receiving said pseudo random codes and estimating the target channel frequency response;

a multiplier for multiplying said pseudo random codes with the estimated target channel frequency response and generating a frequency domain pseudo random frame estimate; and a subtractor for subtracting said frequency domain pseudo random frame estimate from an actual received frequency domain pseudo random frame and sending said far-end error signal to a adaptive estimation block.

5. An adaptive echo canceller comprising:

a frequency domain update block for estimating and updating a frequency response of an echo channel;

a far-end signal estimation block for estimating a frequency response of a target channel and sending a far-end error signal with far-end signals removed to said frequency domain update block for updating the estimated echo channel frequency response; and a time domain echo cancellation block for receiving the updated echo channel frequency response and performing time domain echo cancellation;

wherein said far-end signal estimation block comprises:

a pseudo random number generator for generating pseudo random codes;

an adaptive estimation block receiving said pseudo random codes and estimating the target channel frequency response;

a multiplier for multiplying said pseudo random codes with the estimated target channel frequency response and generating a frequency domain pseudo random frame estimate; and a subtractor for subtracting said frequency domain pseudo random frame estimate from an actual received frequency domain pseudo random frame and sending said far-ear error signal to an adaptive estimation block.

6. The adaptive echo canceller according to claim 5, said frequency domain update block comprising:

a replication block for receiving a frequency domain signal and generating a replicated frequency domain signal;

an adaptive estimation block for receiving said replicated frequency domain signal and outputting the estimated echo channel frequency response;

a multiplier for multiplying said estimated echo channel frequency response with said replicated frequency domain signal and generating a frequency domain echo replica; and a subtractor for subtracting said frequency domain echo replica from an actual frequency domain echo signal and generating an error signal for updating said estimated echo channel frequency response.

* * * * *